United States Patent
Burch

[19]

[11] Patent Number: 6,129,641
[45] Date of Patent: Oct. 10, 2000

[54] GOLF PUTTING SCOPE

[76] Inventor: Brian Burch, 712 Quail Dr., Cheraw, S.C. 29520

[21] Appl. No.: 09/189,444

[22] Filed: Nov. 10, 1998

Related U.S. Application Data

[60] Provisional application No. 60/065,199, Nov. 12, 1997.

[51] Int. Cl.[7] .................................................. A63B 69/36
[52] U.S. Cl. ............................................. 473/404; 33/292
[58] Field of Search ................................... 473/404, 407, 473/240, 241; 359/402, 403; 33/292, 286, 290

[56] References Cited

U.S. PATENT DOCUMENTS

| | | | |
|---|---|---|---|
| 2,670,209 | 2/1954 | Fay | 473/241 |
| 3,240,497 | 3/1966 | Taylor | 473/241 |
| 4,116,448 | 9/1978 | Crowe, Jr. | 473/240 |
| 4,839,968 | 6/1989 | Logsdon | 473/404 |
| 4,984,791 | 1/1991 | Labell | 473/404 |
| 5,275,403 | 1/1994 | Jones | 473/240 |
| 5,492,322 | 2/1996 | Smith | 473/404 |
| 5,662,535 | 9/1997 | Smith | 473/404 |
| 5,672,117 | 9/1997 | Dar | 473/240 |

*Primary Examiner*—Steven Wong
*Attorney, Agent, or Firm*—B. Craig Killough

[57] ABSTRACT

A scope which is positioned over a golf ball which is on a green in position for putting has a housing with a mirror and which functions as a periscope. A vertical alignment guide and a horizontal alignment guide are viewable from above the housing. The scope is positioned over the ball and the crossing point of the alignment guides is aligned with the flag stick in the golf cup. The horizontal alignment guide indicates the slope of the terrain. A horizontal level indicates the level of the ground at the ball position, and a slope level indicates the slope of the ground immediately in front of the ball.

4 Claims, 4 Drawing Sheets

GOLF PUTTING SCOPE

This Appln claims the benefit of U.S. Provisional No. 60/065,199 filed Nov. 12, 1997.

FIELD OF THE INVENTION

This invention relates to golf generally, and is more specifically directed to a training and practice aid for golf putting.

BACKGROUND OF THE INVENTION

Putting is an important part of the game of golf. Approximately half the strokes in a game of golf, played at par, are puts.

Good putting requires proper control of the putter. One aspect of proper control of the putter requires proper aim of the ball at the target. However, golf putting surfaces, or greens, are rarely level, meaning that a golfer must "read" the green, and compensate for surface variations in aiming the putt.

Various golf training devices are shown in the prior art. Some of these devices are golf putting aids.

SUMMARY OF THE PRESENT INVENTION

The present invention is a scope which may be positioned over a golf ball which is on a green in position for putting. The scope has a generally hollow housing with a mirror in the housing which functions as a periscope. A vertical alignment guide and a horizontal alignment guide are viewable from above the housing. A horizontal level is mounted to the housing and a slope level is mounted to the housing.

The scope is positioned over the ball, but does not contact the ball. The intersection of the vertical alignment guide and the horizontal alignment guide are aligned with the flag stick which is positioned in the golf hole or cup. The horizontal guide indicates whether the ground is sloping from the right or the left between the ball and the cup. The horizontal indicates the level of the ground at the ball position, and the slope level indicates whether or not the ground immediately in front of the ball is an uphill slope or a downhill slope, or is level.

DESCRIPTION OF THE PREFERRED EMBODIMENT

Figure 1:
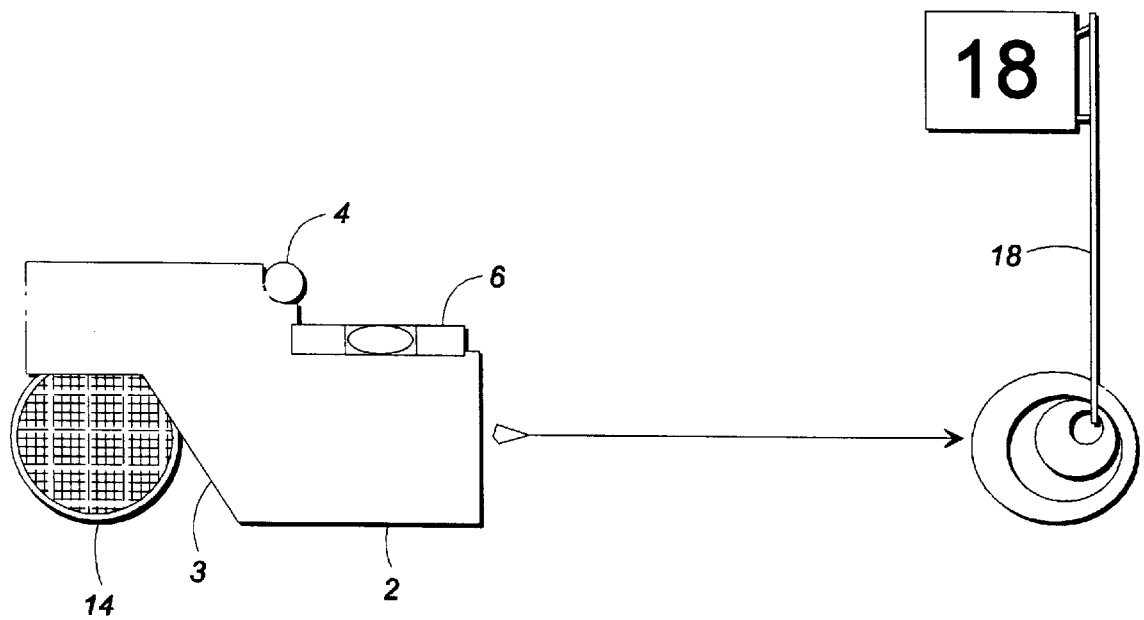
FIG. 1 is a side elevation of the device in position for use.

Referring now to the drawing figures, FIG. 1 shows the housing 2 of the device. The housing is preferred to be generally L-shaped, and hollow.

The device has a horizontal level 4 which is mounted on an exterior surface of the housing, and which may be described as a left-right level. In the preferred embodiment, level 4 is mounted on the upper portion of the L as show in FIGS. 1 and 2.

Figure 2:
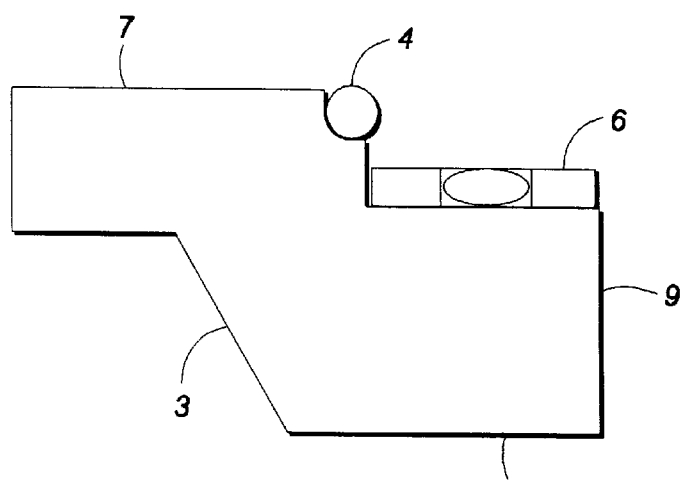
FIG. 2 is a side elevation of the device.
Figure 3:
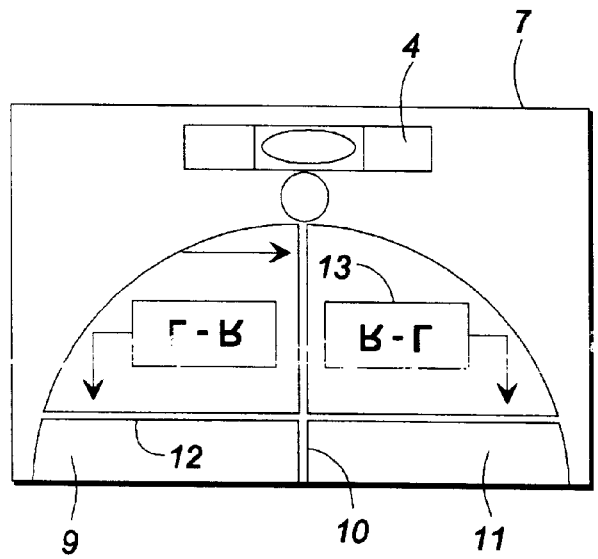
FIG. 3 is a frontal elevation of the device.
Figure 4:
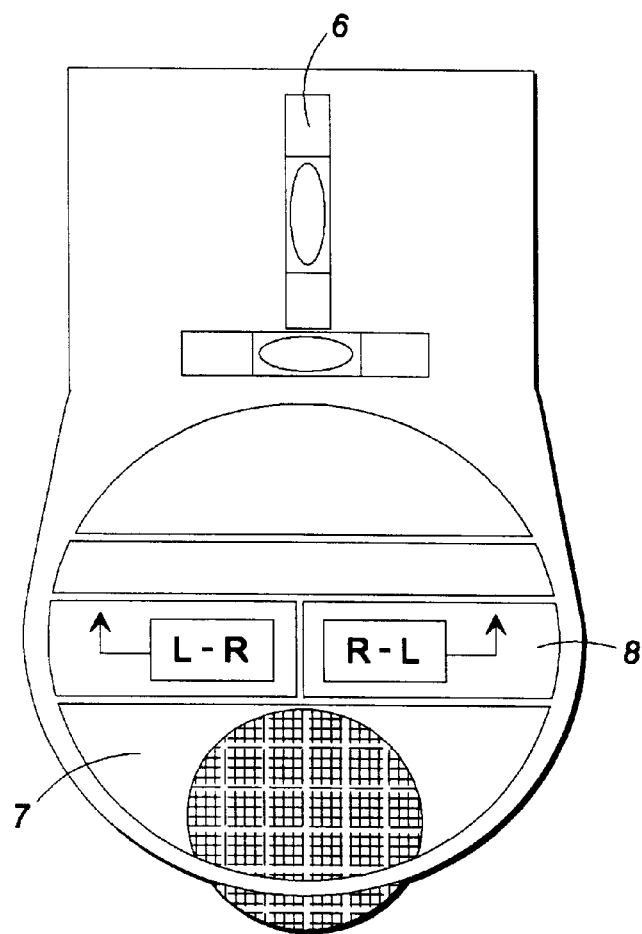
FIG. 4 is a plan view which view demonstrates a view through the view finder.

A second level 6 is used to indicate slope. The slope level 6 is positioned at generally 90° to the horizontal level, and below the horizontal level in the embodiment shown in the drawing figures. The slope level is positioned on the exterior of the housing, as shown in FIGS. 1 and 2, and may also be describe as a front-back level.

In the preferred embodiment, the levels 4,6 comprise a floating member which floats within a liquid contained in a sight glass. When the level is on a level surface, the floating member is positioned relative to indicator lines. The level is a gauge of the type used by carpenters and other tradesmen to determine level surfaces. Other devices which indicate level surfaces could be used as levels, such as electronic indicators.

A mirror 8 is positioned within the housing and allows the housing to perform as a periscope. The mirror is positioned so that a viewer looking through the top opening 7 of the housing may view though the front 9 of the housing. The mirror is positioned as necessary to perform this function given the structure and the dimension of the housing. As shown in the preferred embodiment, the mirror is positioned at about a 40 degree angle to the horizontal, but the required angle will depend upon the dimensions of the housing.

A rear opening 3 is provided in the housing which accommodates a golf ball. The rear opening is at least partially underneath the top opening 7, and is preferred to have a notched or angled structure as shown in FIGS. 1 and 2.

Referring now to FIG. 2, a vertical alignment guide 10 and a horizontal alignment guide 12 are present within the housing and provide cross hairs for viewing and analyzing the terrain. These guides are positioned in front of the mirror so that the user can view the pins from the opening in the top housing. When the housing is sitting on a level surface, the vertical guide should be as close to truly vertical as is reasonably possible, given construction or manufacturing tolerances, and the horizontal pin should be as close to truly horizontal as is reasonably practical, given construction and manufacturing tolerances. The alignment guides may be printed upon a transparent member 11 which is located on the front of the housing. Slope indicators 13 may also be printed on the transparent member. As shown in the drawings, the slope indicators are printed in reverse for viewing in mirror 8 through opening 7.

In use, a golf ball 14 is in position on a putting surface, such as a green. The device is positioned between the ball and the golf cup, with opening 9 positioned opposite the ball and closest to the cup. The user, while in a kneeling position, aligns the crossing point of the alignment guides generally with the flag stick 18, which is positioned in the target cup.

Figure 5:
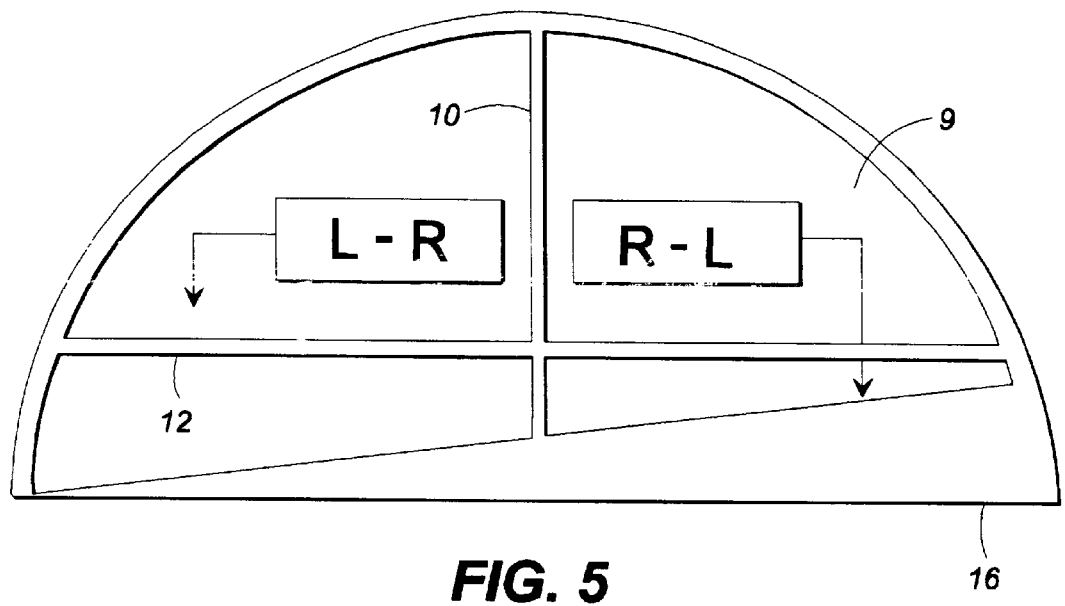
FIG. 5 is a schematic view demonstrating a view through the view finder.
Figure 6:
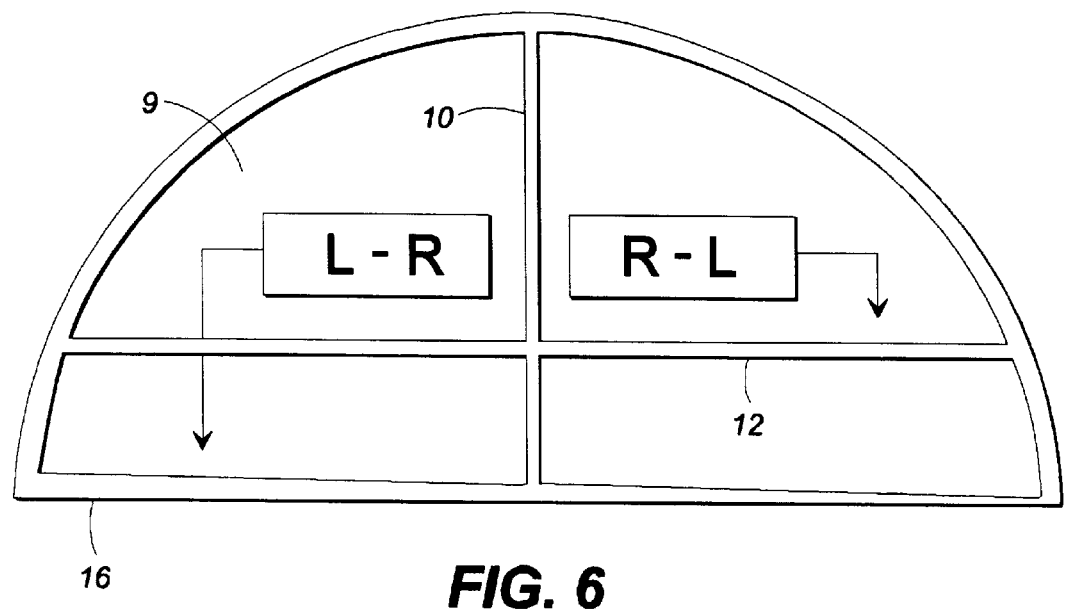
FIG. 6 is a schematic view demonstrating a view through the view finder.

The device is tilted until the level 4 centered, or it indicates a level attitude. Viewing through the opening 7, the user compares the alignment guide 12 with the green or putting surface. If the green appears as in FIG. 5, a right to left break is indicated. If the green appears as in FIG. 6, a left to right break is indicated. A level surface indicates that there is no break in the green.

Figure 7A:
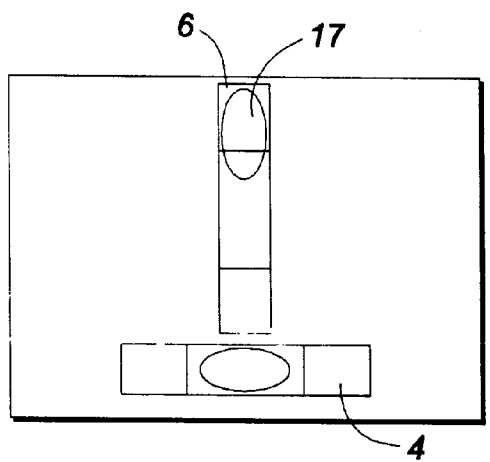
FIGS. 7a, 7b and 7c demonstrate the positions of the levels 6,8 when the device is variously positioned on a putting green.
Figure 7B:
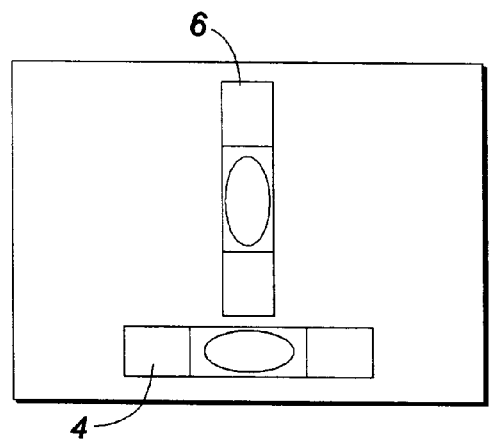
Figure 7C:
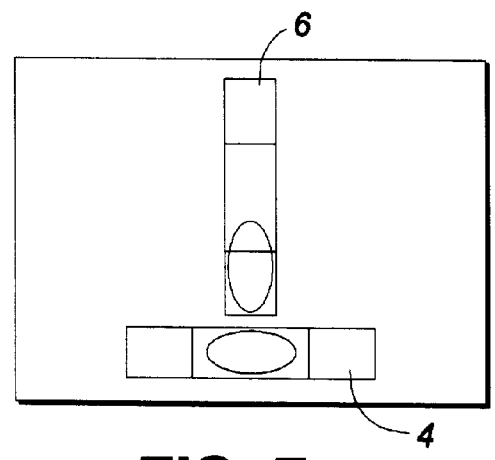

The device is then positioned to fully rest upon the green. The slope level 6 indicates whether the surface between the ball and the green, and immediately in front of the ball, is uphill or downhill. If the bubble 17 is as shown in FIG. 7a, the putt will initially be uphill. If the bubble is as shown in FIG. 7c, the putt will initially be downhill. If the bubble is as shown in FIG. 7b, the putt will initially be on a level line.

The device gives an indication of the surface of the green, without the user relying on purely subjective judgement of the slope and break of the green between the ball and the target golf cup. The golfer can adjust the putting stroke according to this gauge, to properly address the ball with the best chance at placing the ball into the cup.

The device may also be used as a training device. The golfer, through experience, can compare his visual judgement to the "read" given by the device. The device is generally accurate for distances up to 12 feet. Over time, the user's ability to judge the slope and break of the green will improve.

What is claimed is:

1. A golf putting scope for analyzing a contour of a putting surface, comprising:
   a. a housing which is not mounted to a golf club, said housing having a base which supports said housing as said housing is positioned on a golf putting surface;
   b. an angled mirror which is positioned within said housing, wherein a lower edge of said angled mirror is adjacent to the golf putting surface;
   c. a vertical alignment guide which is positioned in a front portion of said housing and in front of said mirror and a horizontal alignment guide which positioned in a front portion of said housing and in front of said mirror, wherein said vertical alignment guide and said horizontal alignment guide are viewable in said mirror from above said mirror; and
   d. a first level which is positioned on said housing.

2. A golf putting scope for analyzing a contour of a putting surface as described in claim 1, further comprising an additional level which is positioned on said housing at generally a right angle to said at least one level, and wherein said first level and said additional level are positioned generally horizontally on said housing.

3. A golf putting scope for analyzing a contour of a putting surface as described in claim 1, further comprising a transparent member which positioned in said front portion of said housing, and wherein said vertical alignment guide and said horizontal alignment guide are present on said transparent member.

4. A golf putting scope for analyzing a contour of a putting surface as described in claim 3, wherein a slope indicator is present on said transparent member.

* * * * *